(12) United States Patent
Steinhilper et al.

(10) Patent No.: US 7,587,804 B2
(45) Date of Patent: Sep. 15, 2009

(54) SYSTEM AND METHOD FOR OPTIMIZATION OF PRODUCT THROUGHPUT

(75) Inventors: Eric A. Steinhilper, Harrison Township, Macomb County, MI (US); James N. Nickolaou, Clarkston, MI (US); Henry W. Baker, Novi, MI (US); Norman Ellis Hovis, Jr., Linden, MI (US)

(73) Assignee: General Motors Corporation, Detroit, MI (US)

( * ) Notice: Subject to any disclaimer, the term of this patent is extended or adjusted under 35 U.S.C. 154(b) by 612 days.

(21) Appl. No.: 11/017,413

(22) Filed: Dec. 20, 2004

(65) Prior Publication Data
US 2006/0136085 A1    Jun. 22, 2006

(51) Int. Cl.
*B21D 39/03* (2006.01)
(52) U.S. Cl. ........................................................ 29/430
(58) Field of Classification Search .................. 29/430, 29/722, 703, 783, 700; 700/111, 108, 112, 700/115
See application file for complete search history.

(56) References Cited

U.S. PATENT DOCUMENTS 5,317,727 A * 5/1994 Tsuchida et al. ................ 707/2

6,662,064 B2    12/2003 Vollmar et al.
7,117,872 B2 * 10/2006 Draghetti et al. ............ 131/280

OTHER PUBLICATIONS

GE Products and Services "Software Solutions" http://www.geindustrial.com/cwc/gefanuc/software₁₃ solutions.htm.
GE Fanuc "Proficy™ Plant Applications" http://www.gefanucautomation.com/downloads/products/Proficy/PlantApplications_CutSheet.pdf.
Rockwell Automation Global Manufacturing Solutions "Open Visual Access of Your Production Status" http://literature.rockwellautomation.com/idc/groups/literature/documents/ap/gmse00-ap020_-en-p.pdf.
Iconics Automotive "Proven, Innovative Solutions for Automotive Manufacturing" http://www.iconics.com/industries/automotive.asp.

* cited by examiner

*Primary Examiner*—John C Hong
(74) *Attorney, Agent, or Firm*—John A. Miller; Miller IP Group, PLC (57) ABSTRACT

A system, method and apparatus are provided so that the machines and machining stations and the distribution of product along a production line may be managed in a variety of manners while data is taken and analyzed in accordance with this invention to provide optimization conditions for improved throughput. A historical analysis of zone performance provides the preferred range for the number of upstream and downstream products for each particular segment, machine, or station. An end of shift staging analysis provides the optimized number of upstream and downstream products for each particular segment, machine, or station at the start of the next shift.

18 Claims, 10 Drawing Sheets

SYSTEM AND METHOD FOR OPTIMIZATION OF PRODUCT THROUGHPUT

TECHNICAL FIELD

This disclosure relates generally to a system, method and apparatus for collecting data on product (or unit of production) control in a manufacturing, assembly or other type of plant, analyzing the data for various control methods, and providing efficient throughput. More specifically, a plant may be divided into sections permitting work in progress to be managed in a variety of manners while data is taken and manufacturing line performance analysis provides the optimized distribution of work in progress (upstream and downstream of particular locations or machines) all along the manufacturing line.

BACKGROUND OF THE INVENTION

In large scale manufacturing and assembly plants, such as those used in automobile manufacturing, hundreds of machines and their machine operators may work simultaneously. In a large production environment, the production line may include miles of conveyors. The plant itself may be millions of square feet. An increase in the precision of production timing and/or control may provide better resource allocation. Accordingly, process and controls that keep the line moving may increase production and reduce expenses.

A plant's hours of operation may include three shifts. For example, at the beginning of the day, oftentimes there is work in progress left at the end of the previous shift. Work in progress includes but is not limited to units of production, pallets, carriers, product, parts and units of production and items of production. In a typical plant-floor manufacturing environment, it is the line supervisor's responsibility to promote modifications to the system to optimize product throughput. Throughput is the number of items produced or processed during a period of time. Prior to beginning each shift the line supervisor may manually redistribute the work in progress so that operations throughout the shift will run more smoothly than if production started with work in progress where it was at the end of the previous shift. However, in large systems (where the supervisor cannot see the entire system) it becomes almost impossible for the supervisor to see and/or control product or unit of production location(s) to maximize throughput. Therefore, at the beginning of shift, oftentimes the shift will indeed start with the parts where they were left by the shift that just ended.

Along the many sections of conveyor of a large plant, there may be a plurality of sections that are empty or full. A buffer is storage area such as a conveyor, transport (i.e. forklift, cart, truck, etc.), silo between stations (either manual or automatic), or simply a place on the floor. A buffer generally can hold parts in excess of standard in-process stock, and provides capability to cover potential production losses due to downtime, lost time, and quality issues. Here, standard in-process stock means the minimum number of parts on the line required to maintain continuous flow of products through the manufacturing line at the intended line speed.

If a buffer is empty, the station drawing from that buffer is starved. If a buffer is full, the station feeding that buffer will be blocked. Because of the difficulty in manually managing the contents of the buffers, line supervisors traditionally allow buffers (which may include pallets holding large units of production such as engines or entire automobiles in different stages of assembly), to become congested during the manufacturing day. This congestion, or fullness, causes starvation in some areas of the line while causing blockage or congestion in other areas.

As the line balance deteriorates throughout the day supervisors will often manually manage the system workflow using time (i.e., breaks and lunches), resources (i.e., working certain sections of the line while furloughing other sections), or functionality of the line (i.e., potential buffering to support loading and unloading of product from the line). This manual approach to workflow management leads to a system that changes based on the then present circumstances. Production is therefore less predictable than desired, and costs for manpower may not be well managed.

In a single shift, a machine station at an automotive plant may process up to hundreds even thousands of products. The conveyor belt may move at several feet per second. The line moves fast and operations are complex. In a single automotive assembly line, there may be hundreds of machine stations and zero or more machine operators per station. Stopping a unit of production for staging or choosing to let the unit of production move on a conveyor belt under the continuous flow model is a decision that can cause problems if the wrong approach is taken. Since stopping a unit of production from moving takes typically 0.5 seconds over takt time, units of production can become bottlenecked quickly and downstream machines can be starved. Over the course of processing 1000 units of production per shift an ad hoc and manual approach may mean substantial losses in time and resources.

SUMMARY OF THE INVENTION

A system, method and apparatus are provided so that units of production may be managed in a variety of manners while data is taken and analyzed to provide and identify optimization conditions for improved throughput. The manner in which the step(s) of and module(s) for analyzing the throughput as a function of the number of items in the upstream buffer and the number of items in the downstream buffer may take many forms.

In another aspect of the disclosed system, method and apparatus, data is collected in variety of manners and indicia are provided reporting the confidence level of the data collected.

In a further aspect, a process to perform an analysis of historical performance on a section, zone, or machine provides the optimized number of upstream and downstream units of production or product for the corresponding segmentation. A range of numbers is also within the scope of the technology provided herein and may be signaled to station operators, machine controllers and line supervisors.

In yet another aspect an end of shift staging analysis provides the optimized number of upstream and downstream units of production for a particular machine at the start of the next shift.

DESCRIPTION OF THE PREFERRED EMBODIMENT

Figure 1:
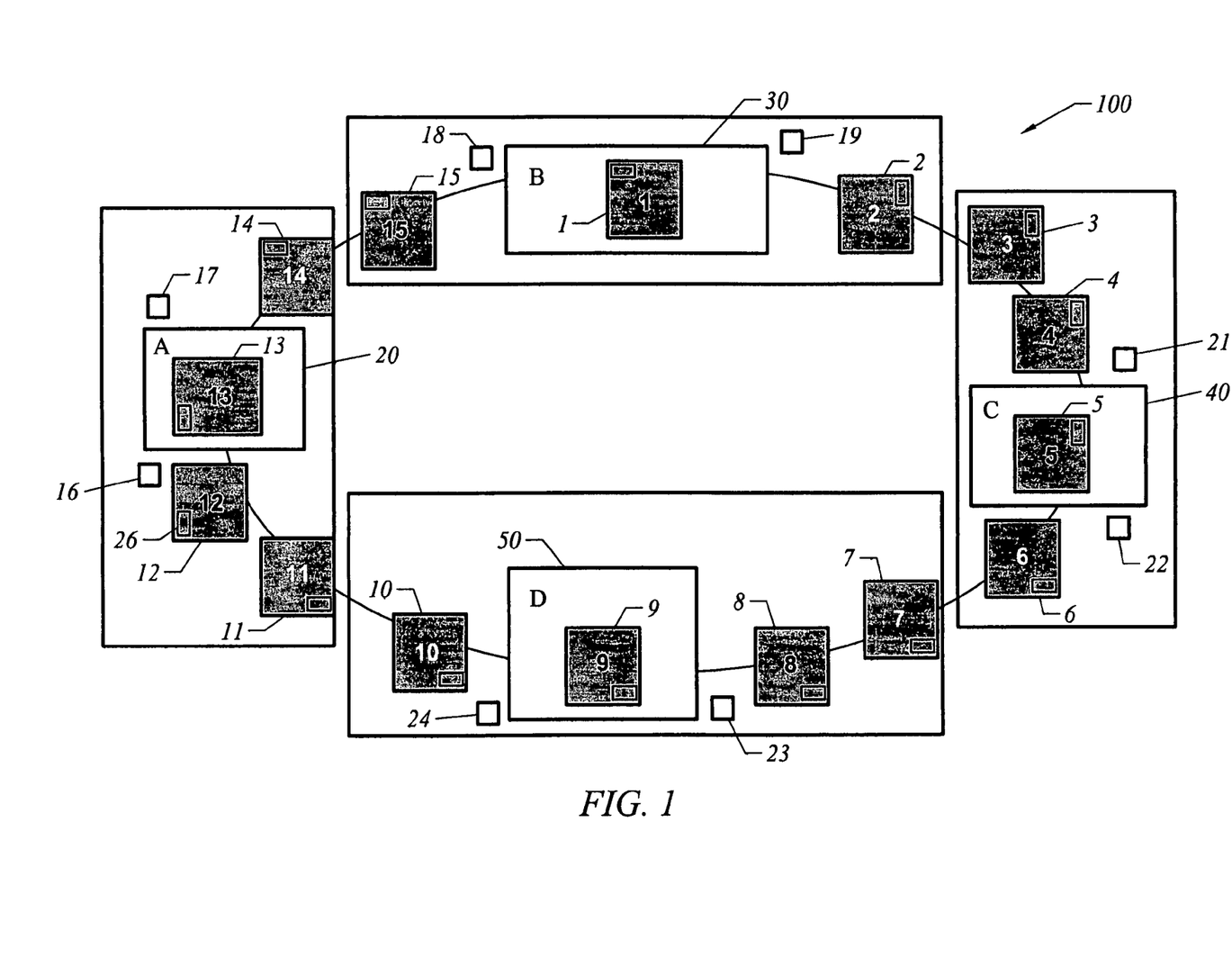
FIG. 1 is a generic schematic depiction of an assembly line.

In accordance with exemplary embodiments, an asynchronous assembly loop system 100 is shown in FIG. 1. A pallet based engine assembly line is provided as an example. However, it is understood that implementation of the method, system and apparatus described herein is applicable to any plant manufacturing any product and is considered within the scope of the technology described herein. The advantages and disadvantages of different types of loops may depend upon a number of factors, including the type and size of plant, the item manufactured, and the segmentation chosen for the loop.

FIG. 1 shows a generic example of an assembly loop for the purposes of illustration. This disclosure illustrates a system, method and apparatus to maintain balance on production lines and rebalance lines when disruptions occur. Information such as that shown in FIG. 1 may be arranged to fit on a display screen and then transmitted to a display device (see FIG. 2 for a remote location) so that operators will be able to monitor the contents of buffers in a real time manner, in a historical manner and a projected manner. Computer simulations of the units of production flow through buffers by discrete event simulation may provide projected information based on the then current information collected by sensors as shown in FIG. 1. Also provided on a display may be data from the plant in analytical form (i.e. curve fitting) for further analysis. Display units may further be positioned on the floor.

A unit of production typically contains a cradle that supports the product for manufacture. In this example shown in FIG. 1, fifteen possible unit of production positions (numbered 1 through 15) are depicted by the squares preceding, within or following the four stations depicted (A, B, C, and D). In this example the stations in combination form four distinct groups of unit of production control areas, or zones. Other situations may be more than one station per zone.

In FIG. 1, unit of production designators 1, 4, 5, 8, 9, 12, 13, and 15 are in black type to signify that the unit of production position currently contains in process stock. Unit of production designators 2, 3, 6, 7, 10, 11, and 14 are in white type to signify the unit of production position is currently unoccupied.

A unit of production may have an identifying tag (e.g., a Radio Frequency Identification (RFID) tag, or a bar code strip) that is read optically or electronically at a position on the line. The line may instead or in addition have a discrete proximity switch to indicate a unit of production is present at the position. In the example of FIG. 1 where a computer does the tracking and control, Station A at 20 controls its in-station-stop and the on-deck-stops (12, 13) and the zone associated with Station A would control stops at 11, and 14. Station B at 30, with its associated zone, controls stops at stations 15, 1 and 2. Station C at 40, with its zone, controls stops at 3, 4, 5 and 6. Station D at 50 along with its zone controls stops at stations 7, 8, 9 and 10. Stations A through D have inputs and outputs associated with their appropriate station(s). Sensors of any types are depicted as 16-19 and 21-24.

Figure 2:
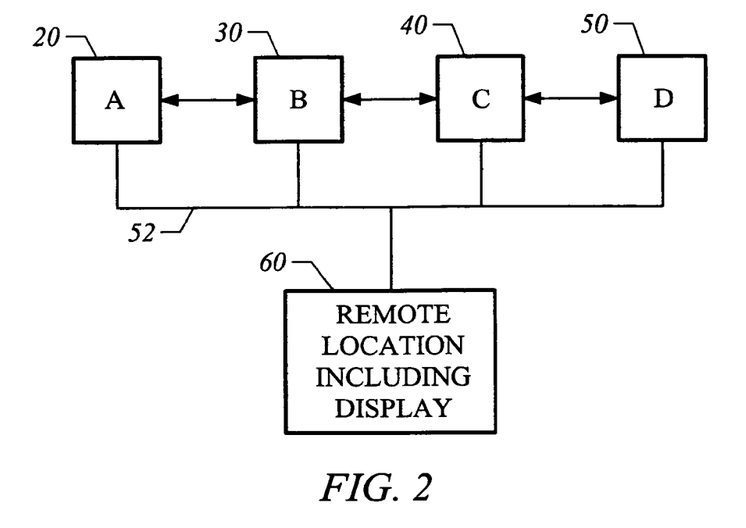
FIG. 2 shows an example of a communication architecture for a production plant.

In a machine line the architecture may have some form of inter-machine communication between machines A through D 20-50. FIG. 2 shows an example of a communication architecture, where machines A through D 20-50 communicate, via plant network 52, to a remote computer 60 which in turn may bridge the communication(s) between the A through D systems.

Figure 3:
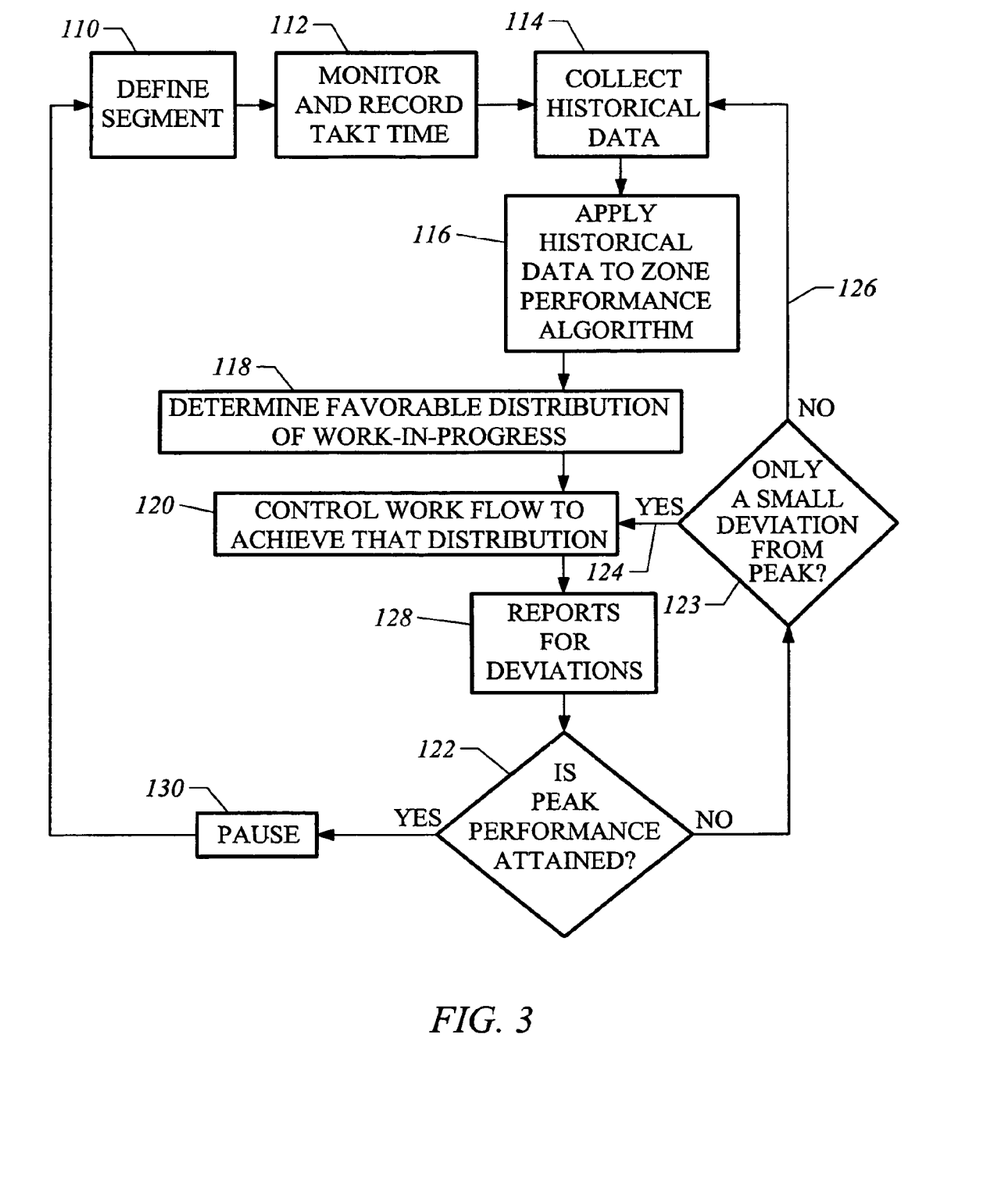
FIG. 3 shows an embodiment of the method as described in detail below.

Referring now to FIG. 3, in an implementation of an embodiment of the technology described herein, a defined segmentation step 110 is employed. The entire plant, or a portion of the plant may be defined into smaller segments to make pallet control more manageable. Segmentation of the production line may be adjusted after the initial implementation. Segmenting the system into too small of a section (i.e., insufficient buffers and machines in the segment) or into sections too numerous to manage is avoided. Smaller segments may be used for monitoring a manual station or section. Larger sections may control unit of production stops. As used herein, a segment, a production line station, and a machine are used interchangeably. In a most basic sense, a single machine is fed by one buffer. This tends to be the smallest segment. A more common segment is a series of alternating buffers and machines. Many other configurations are possible including combinations with parallel lanes, sequential machines, or sequential buffers making up a part of the segment.

After segmentation, monitoring and recording of the takt time is provided at step 112. The takt time of product flow through the system or individual segments may be measured. Various methods for collecting this information may be used including a stopwatch and electronic time collection.

Processes for collecting historical data 114 segment by segment on causes of machine related losses such as downtime, overcycles, product starvation, empty units of production, etc. are implemented. An analysis determines how many in-buffer-stock units are required to effectively keep each segment operating during these losses. The process for collecting data may utilize sensors, other electronics and machine controllers. Machine and conveyor belt controllers, the same or others, may operate to inhibit or speed up units of production based on a signals received relating to deviation from optimal buffer content numbers.

Operational considerations may also be taken into account. At any time, the operation staff wants the ability on the plant floor to "override" any controlled location. There are several reasons for this, e.g., computed unit of production counts are inaccurate, potential anticipation of a future event, for example, loss of communication to the upstream or downstream unit of production counting system, and loss of communication to the remote computer.

Information included in the historical data may include for example, the health of the segment, the status of the unit of production control logic of the segment, and more importantly, an override or change capability of the modes of operation of the segment, that is, whether it is in the traditional, staging, or continuous flow mode as discussed above.

In the example FIG. 1 above there are 15 possible unit of production positions. Typically a discrete bit (proximity switch), identified by sensors 16-19 and 21-24, is used to determine if a part is at or is passing any location. In a static state (no movement of parts on a system), a machine controller is capable of counting properly. However, in a dynamic manufacturing environment, there is a potential for the transition of this bit to be doubly counted by the plant machine controllers (A through D), resulting in erroneous counts. Moreover, a unit of production may be removed from a section of the line. Either of these events then may require special logic to allow for self-adjustments in unit of production counting.

If the appropriate sensors or PLCs inputs are available from the system, adjustment to the in process product count can be made by monitoring the machine state(s) to determine if the machine is in a static or dynamic state. A machine, section, or system is in a static state if the monitored motion for that area has stopped, including all machines, stations, conveyors, etc. A stoppage typically occurs for shift changes, breaks, lunches, large duration machine faults, halts, team meetings, etc. A dwell is used (typically 10 minutes) to determine if motion is stopped. After this dwell time has passed and the machine or line is in a static state, the unit of production counts are re-calculated and updated in the machine controllers and or remote computer.

A heartbeat signal may also be used between computational devices. If no heartbeat is present (between devices) then any automated unit of production containment system may revert back to a pre-defined mode of operation. In one embodiment, an annunciation and record of the last update time is provided to ensure that the data is current. In one embodiment, the discrepancies found in automatic adjustments to work in process counts for each segment are logged. These can be further analyzed historically for the root cause of the adjustment.

If insufficient inputs are provided then it is desirable in computation algorithms for self-adjustment of unit of production counts, based on date/time and/or product serialization, for the counts not to fall outside the minimum and maximum physical layouts. Still referring to FIG. 3, and now also to FIG. 4, once the counting and historical data has been collected for a particular segment, analysis of the data is done at 116. The step(s) of and module(s) for analyzing the throughput as a function of the number of items in the upstream buffer and the number of items in the downstream buffer may take many forms as discussed below.

Figure 4:
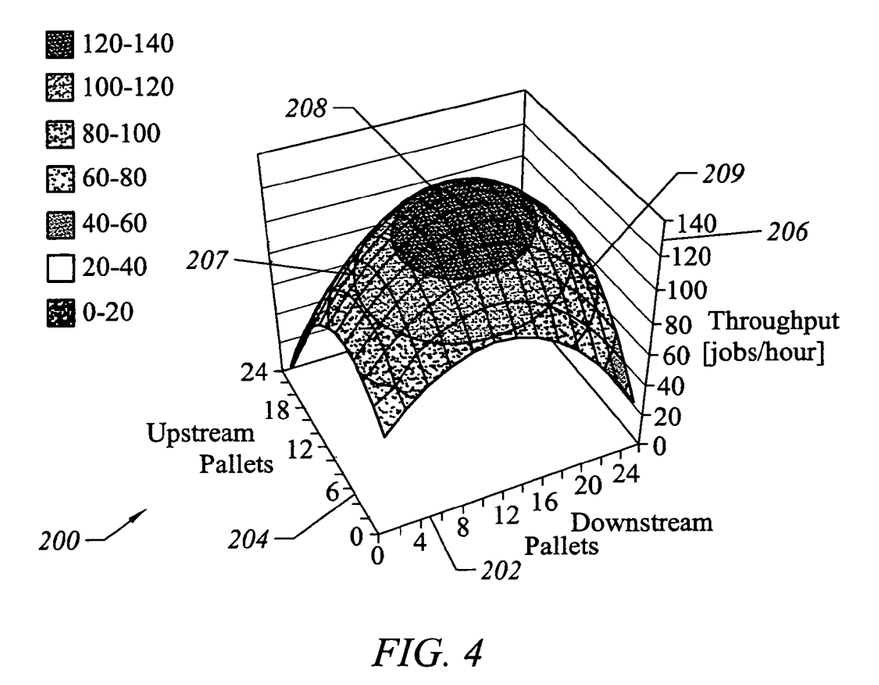
FIG. 4 is a throughput histogram of historical zone performance data.

Applying the data to one or more historical zone performance algorithms generates an analysis 200 of low to peak performance for one or more machines or segment. Referring to FIG. 4, along the nearly horizontal x-axis 202 are downstream units of production, along the backwards pointing y-axis 204 are the upstream units of production. The throughput in jobs/hour is along the vertical z-axis 206. In this example the highest or peak throughput 208 occurs with approximately 12 units of production upstream of the machine and twelve to sixteen units of production downstream of the machine. These values may be targeted during operation as the optimal number of units of production in the buffers for this machine. Returning to FIG. 3, results for each station similar to those shown in FIG. 4 are inputs to determine a favorable distribution of work-in-progress 118 according to which product can be pre-positioned along the production line before the start of the next shift.

In FIG. 4, there may be two "yellow zones" as indicated by the number 207 and 209. This represents a cross section through the surface at 12 upstream units of production. The number of downstream units of production can "enter a yellow" by becoming either slightly smaller than the optimum number of downstream units of production (about 14 in this figure) or slightly higher.

With this strategy 120, the plant spends a short period of time at the end of a shift, or before the next shift, setting the stage for the next shift so that it will have favorable starting conditions. The behavior of the line is dynamically modified during a shift so that the contents of a buffer remain within a range close to that of the peak throughput 206 as shown in FIG. 4.

Figure 5:
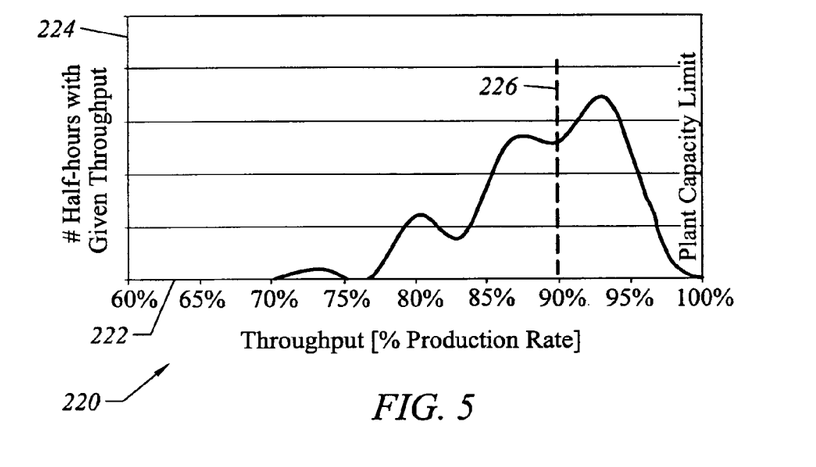
FIG. 5 shows a histogram used to select data for the construction of FIG. 4.

FIG. 5 shows the result of an intermediate process used to specify the value of the vertical axis for FIG. 4. In FIG. 4, the throughput histogram is for a limited range of parts in the upstream buffers and a limited range of parts in the downstream buffers. A histogram is a visual or graphic representation of the throughput in relation to buffer content. Other visual or graphical representations in 3-dimensions and 2-dimensions may be made such as a strip chart and a pie chart. Tabular output such as list may be formed to provide the same information. Moreover, the information may be provided in an analytical expression or any other output mode. Indicia (i.e. color, markers and/or icons) may be provided to a display screen or any other output device such as a PDA for real-time information of buffer contents, optimization information, deviation therefrom, historical data and projections.

In the case of a histogram, the range or bin size for the buffer contents as well as the number of buffers that may be included in the range of parts may be values, which may be readjusted from time to time. In the 2-D bin configuration 220 where the x-axis 222 is throughput as a percentage production rate, where the y-axis 224 is a time period (in this case, the number of half-hours) with a given throughput and where 226 is the 90% line, a desired level, (for example an initial level may be chosen, 80%, 90%, or 95%), is chosen but other cutoffs may be chosen. In this example, 90% has been chosen as an operational target. Then from the histogram, the number of incidents with throughputs higher than this value is summed and used as the vertical axis for the FIG. 4.

In another embodiment, the data is filtered. For example, it is likely that situations for which the upstream buffer is empty because the machine that feeds it is starved, or the downstream buffer is full because the station that draws from it is blocked, may be removed from the data used to create the histogram shown in FIG. 5. It is a choice in implementing an embodiment whether these data may be included or excluded if the blocking or starving exceeds a certain percentage of the duration of the throughput sample.

At least 10 bins may be included in the range of the buffers to get good resolution. The range itself might be defined in several ways. It may be the single buffer upstream and the single buffer downstream. Another choice is the sum of all buffers between the machine and the nearby bottleneck, or it may be enough buffers to hold ten or fifteen minutes of production.

The bin size for the histograms is generally chosen after the range of buffers, zones, or machines has been decided. If the range of buffers is that position adjacent to the machine, then the bin size is usually one—a single part. If the range of buffers is larger, say extending to a bottleneck, then the bin size probably may be one tenth to one twentieth of the capacity of the buffer range.

Figure 6:
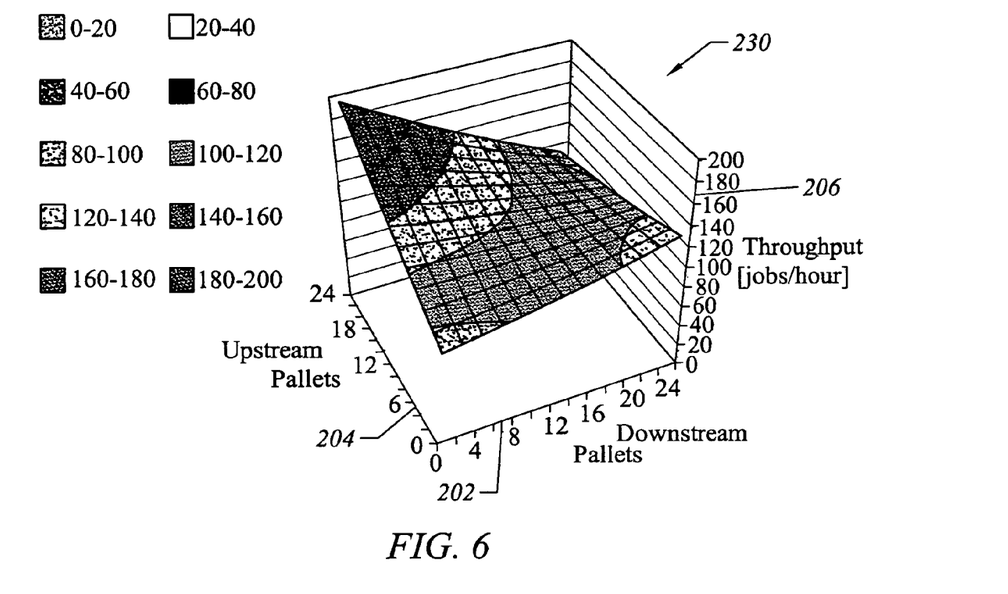
FIG. 6 shows a throughput histogram of historical zone performance data.

Depending upon how the line was set up, the contour surface shown in FIG. 4 may have different shapes. FIG. 6 shows another possible functional dependence of throughput on buffer content. FIG. 6 shows graph 230 where included along the x-axis 202 are downstream units of production, along the y-axis 204 are the upstream units of production. The throughput in jobs/hour is along the vertical z-axis 206. FIG. 6 shows a set of data different from that of FIG. 4 which is a hyperbolic surface that indicates the machine runs best when the upstream buffer is full and the downstream buffer is empty.

Returning to FIG. 3, the actual implementation of a control strategy in the plant will depend on the shape of the curves. A number of different control strategies can be devised. As described above, the technology of this disclosure provides that a plant or part of a plant may spend a period of time at the end of a shift, or before the next shift, setting the stage for the next shift so that it will have favorable start-up conditions. In the implementation step 120, another approach is to shut down the line down segment by segment in phases by the control system to (i.e., when working through breaks, lunches, scheduled or unscheduled line stoppage events) in such a way that machines shut off as the most favorable buffer counts are reached. The quality step 122 keeps track of whether the percentage of throughput is at its peak performance. The system may then be in a position to restart the process by returning to the define segment step 110 after a pause 130.

Referring to FIG. 5, if the number or range 226 chosen for producing the peak performance of a machine is 80% (instead of the 90% shown) of the time, in the quality step 122, the value is checked against this 80% criterion. If the throughput performance does not meet this 80% criterion, then it is determined at step 123 whether the value is a small deviation—e.g., 5%—from the target, or a large deviation from the target. In the first instance where it is a small deviation from the target 124, the process returns to step 120 and the buffer is adjusted. If there is a large deviation 126, the prescribed action may be to return to the beginning of the process and collect data at 114 and analyze it at 116 to devise a new favorable distribution of work-in-progress at 118. In any event, the criteria checking step of 122 monitors the results and reports deviations at step 128.

The criteria checking step 122 provides information to report to line operators the state of the balance and thereby provide feedback. In some cases a static indication of where units of production (or products) need to be may be provided. An example of this is a piece of tape on the line with a well understood operational plan that tells the operator he/she needs to maintain units of production to this taped line when the units of production are available.

Figure 7:
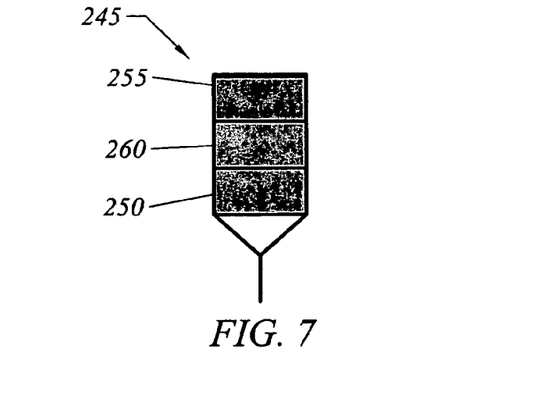
FIG. 7 depicts a red/yellow/green stackpole configuration.

In other cases, because of physical line layouts or station size, a red/yellow/green stack pole light indicator 245 mounted in front of an operator shown in FIG. 7 would signify to the operator whether additional units of production were needed to support the downstream stations. In some embodiments, ranges of unit of production counts, or content, for each in-process buffer are established. For one such range, say the "green" range, the buffer contents are close to the target, so that station operates at its peak. A green indication 250 tells the operator there are sufficient units of production immediately upstream of the next section of the line to support continuous manufacture on the next section.

A red indication 255 would tell the operator units of production downstream from his/her position are needed promptly. When the in-process buffer content drops to the "red" range, the machine controllers stop the appropriate machines until the buffer contents are again acceptable.

A yellow indication 260 tells the operator the upstream units of production (in process stock) are reaching critical level and again, every effort may be made to replenish in-process stock upstream of this line position. Potentially two yellow ranges might exist for a single buffer: one for which the contents were a little below the green range and another where they were a little above the green range. In another embodiment, a separate indication is provided when too many parts are present vs. almost two few parts. A flashing yellow might indicate too few parts and a solid light might indicate too many are present. Alternatively, both the green and yellow lights may be on when too many parts are in the buffer and just a yellow light on when there are too few parts. When the buffer content falls within either "yellow" range, upstream or downstream machine controller may slightly increase or decrease the cycle time accordingly. The machine controller could also keep the cycle time the same and delay loading parts from the upstream buffer when that buffer has too few parts.

During a segment being "in the red" or "in the yellow" the operations staff performs tasks to ensure the return the segment to peak performance. This may include assuming a portion of the operator work load (i.e. press the release button on the line to save a few seconds, helping with dunnage changeovers, coordinating activity for maintenance repair, responding to faults quicker, and if necessary, beginning the process of potentially working segments through breaks and lunches).

The machine controller or line supervisor will synchronize the release of units of production from all locations in which units of production are being held in a manner to avoid releasing units of production to a segment or receiving units of production from adjoining segments one at a time which action may create a cascade of units of production movement through the system. This undesirable situation might be described as one unit of production enters an area and one then leaves. This creates a ripple effect in the release of units of production and actually induces jerkiness to the flow of units of production through the system and an overall loss.

Other control strategies could be based on work in adjacent buffers. For example, if the contents of the upstream buffer entered the "yellow" or "red" range, it might not be necessary to alter the control strategy if there are a number of parts upstream of the buffer that will be arriving shortly. As another example, if a number of adjacent upstream buffers or segments are empty (or they have too few parts), then portions of the line may be slowed or even stopped.

In one embodiment, with the knowledge of the line arrangement the current contents of a buffer can be determined from information obtained by tracking three signals: the part release, machine blocked, and machine starved signals. This is accomplished by updating a buffer content counter (one for each buffer) in a differential mode by using signals from controllers or computers on the machines. It is incremented each time the upstream machine discharges a part to the buffer and decremented each time the downstream machine loads a part from the buffer. When the upstream machine cannot discharge a part because it is blocked, the buffer is full, and the buffer content is reset to the buffer capacity. When the downstream machine cannot load a part because it is starved, the buffer is empty, the buffer content is reset to zero.

Other algorithms for tracking the contents of the buffer may incorporate the time it takes a part to transit the empty buffer in the determination of the proper conditions for resetting the buffer count. In one such case, the buffer content is reset to the buffer capacity when the upstream machine has not been able to discharge a part for a time greater than the time for a part to move one position in the buffer. The buffer content is reset to zero when the downstream machine has been starved for the time it takes a part to transit the empty buffer.

In another embodiment, similar to that described directly above, the sensors or computers are placed along the line external to the machines or in any other position that monitors the units of production position or movement.

Again referring to FIG. 2, the remote computer 60 is in communication with all of the segments and the individual machines of the segments. The buffer content may be added to the display screens viewed at any remote location with minimal cost.

The following is a description of the methodology used in another embodiment for determining the number of units of production in specified sections of an engine assembly line. Described is a method using a marker, such as an RFID tag, which may either be permanently encoded or may be partially or completely re-writable.

The engine assembly line, as shown in FIG. 1, uses a continuous loop system where units of production are allowed to move independently (i.e., not a drag chain) through the system. It is desirable to know at any given time the distribution of units of production throughout the line, which can be tracked by sensors 16-19 and 21-24 reading identifying tags such as the tag 26 shown on unit of production 12. Units of production 1-15 each show a tag although in this example they are not numbered. Information from the sensors on the distribution of units of production along the assembly line is important when making decisions regarding unit of production flow control to optimize assembly line throughput.

Figure 8:
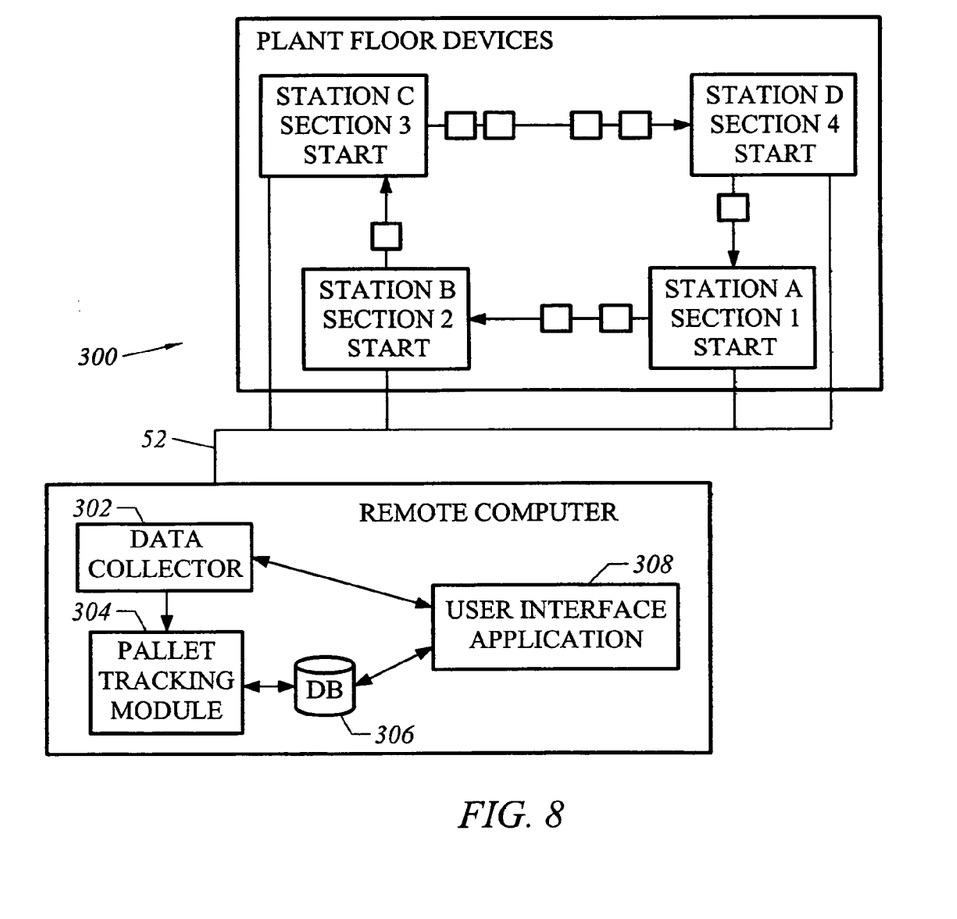
FIG. 8 shows a pallet tracking system.

In FIG. 8 a detailed version of the major components of FIG. 1 is shown. In this architecture of the system each unit of production is uniquely identified by unit of production number, which may be read automatically (by an RFID tag reader, for example) at each station on the assembly line. Also there is a communication protocol running over a network 52, or other mechanism such as a wireless system, for transferring the unit of production number read event and unit of production number information read at each station to the remote computer system on which the unit of production-tracking algorithm is running.

The unit of production-tracking algorithm is implemented in conjunction with a data collector 302, which runs on a remote computer with network connections 52 to each assembly line station computer on the plant floor. Data collector 302 may be capable of processing asynchronous data change events originating from each assembly line station controller.

The unit of production tracking module 304 utilizes a database 306, which is used for configuration purposes as well as to store unit of production tracking information. The data storage data table within the database may be accessed via a user interface 308 to obtain information regarding the distribution of units of production within an assembly system.

Figure 9:
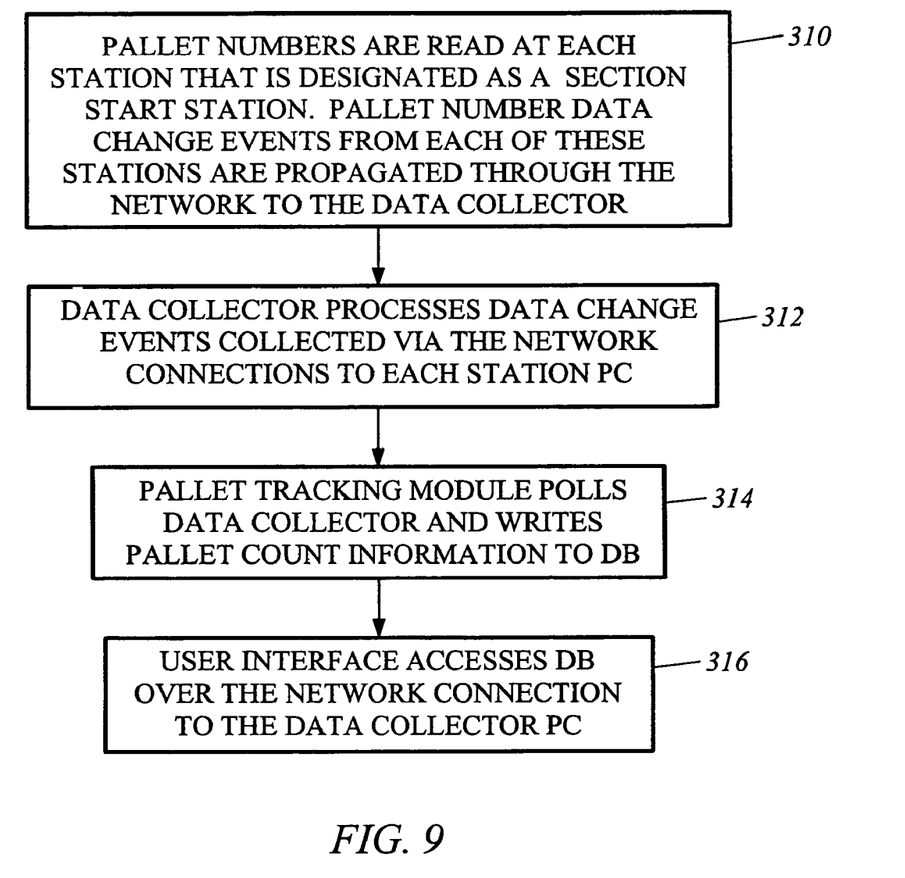
FIG. 9 provides a flowchart for either a sensor based or controller based pallet tracking system of FIG. 8.

A flow chart of this process is provided in FIG. 9. Step 310 provides one of the data generating steps. Step 312 gathers the data change events over the network, making them available within the remote computer. Step 314 provides the procedure for tracking unit of production information. Step 316 provides an output module.

A database configuration table is used to provide information to the unit of production tracking algorithm as to which station computers represent the starting point for each segment on the assembly line within which units of production will be counted. The database also identifies the digital outputs within each controller that correspond to the unit of production number memory locations, unit of production read trigger memory locations, and engine number (EUN) memory locations. In addition to this information, the total number of units of production in the system is available to the unit of production tracking module 314 for the purpose of determining a "level of confidence" that the unit of production tracking module knows the location of every unit of production in the assembly system As engine units of production traverse through the assembly line and enters a station defined to be the start of a section, a sensor, such as an RFID tag reader, at the station reads the unit of production number associated with the unit of production. Reading the RFID tag triggers a data change event (the unit of production number in the unit of production number memory location changed to a different number), which is propagated via a network message from 310 to data collector 312 (302 in FIG. 8).

Unit of production tracking algorithm module 314 monitors data collector 312 and monitors unit of production numbers entering the start of each section of the assembly line. Each time a new unit of production number is read at the starting point of any defined section starting point in the line, the count for that particular section is incremented by one and the unit of production number is added to the database containing a list of unit of production numbers for that section. In addition to processing the new unit of production number information, each section in the line is checked for the unit of production number that has just been read. If a unit of production number match is found in any other section that section's unit of production count is decremented by one and the database of unit of production numbers for that section is updated by removing that unit of production number. The unit of production-read events may occur asynchronously at all section starting points. Data collector 312 processes each event as it occurs. The unit of production tracking module polls the data collector at regular intervals to determine if any unit of production number information has changed.

When looking at unit of production tracking information, it desirable to have some measure of the accuracy of the unit of production tracking algorithm. In order to provide this information to the user, the unit of production tracking module also keeps track of the total number of unique unit of production numbers read at the defined section starting points during its runtime session. This number is compared against the actual number of units of production that are supposed to be in the system (this total number of units of production is defined by the user for a given assembly system). This comparison is made so that the unit of production tracking algorithm can report its "level of confidence" that it knows where all the units of production are in the system. This level of confidence is represented as a percentage of the actual number of units of production in the system. Generally, the level of confidence percentage is equal to the number of unique unit of production numbers read divided by the actual number of units of production in the system.

Figure 10:
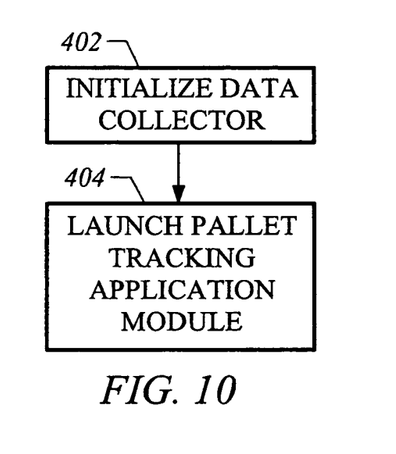
FIG. 10 provides a flowchart for a data collection initializing module.
Figure 11:
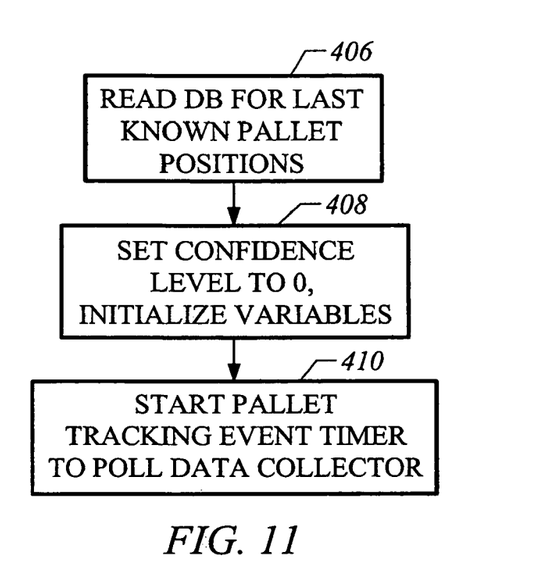
FIG. 11 shows a flowchart for a pallet tracking initialization module.

Referring now to FIG. 10, a data collecting initialization module is shown. When the algorithm is initialized, the number of unique units of production read is zero, thus the confidence level for the unit of production tracking algorithm is zero. Step 402 shows the data collector 302 being initialized. The unit of production tracking application module 304 is launched at step 404. FIG. 11 shows some details of the unit of production tracking initialization module 404. The unit of production positions are recalled at 406, the confidence level is set at zero percent at 408, and the event timer is started at 410.

Figure 12:
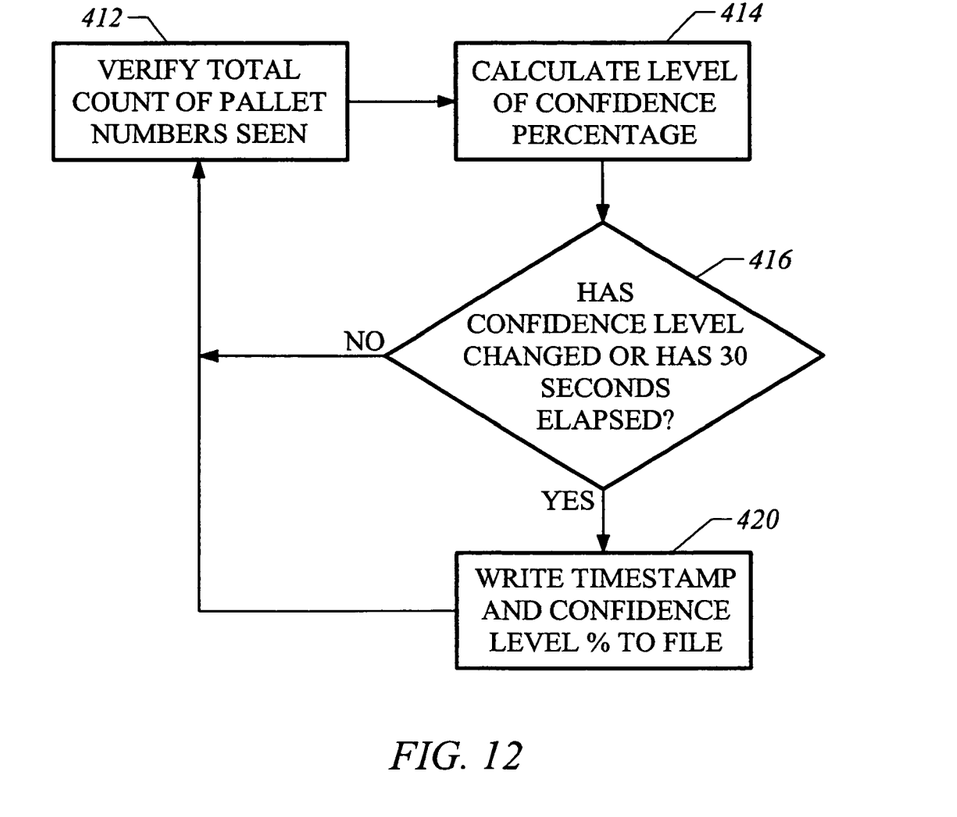
FIG. 12 depicts a pallet tracking data update timer flowchart.

In FIG. 12, a unit of production tracking data update timer flowchart (a component of 312 or 302) is shown. As unique unit of production numbers are read the total number read increases at step 412 so that the level of confidence percentage increases until the unit of production tracking algorithm has read the all the unique unit of production numbers in the system. At this point the confidence level 414 becomes 100%. In one embodiment, the user to knows how recent the information coming from the unit of production tracking algorithm may be. Unit of production tracking module 304 also makes the time of the most recent unit of production number change event to the user. Step 416 tests whether the confidence level has changed or whether a pre-defined amount of time has elapsed. If neither event has occurred, the test is made again after a short delay. If either event has occurred, the confidence level along with a time stamp is written in the database 306; a short delay occurs and the timer update module for the unit of production tracking data is started again. This module runs continuously at a low priority.

Figure 13:
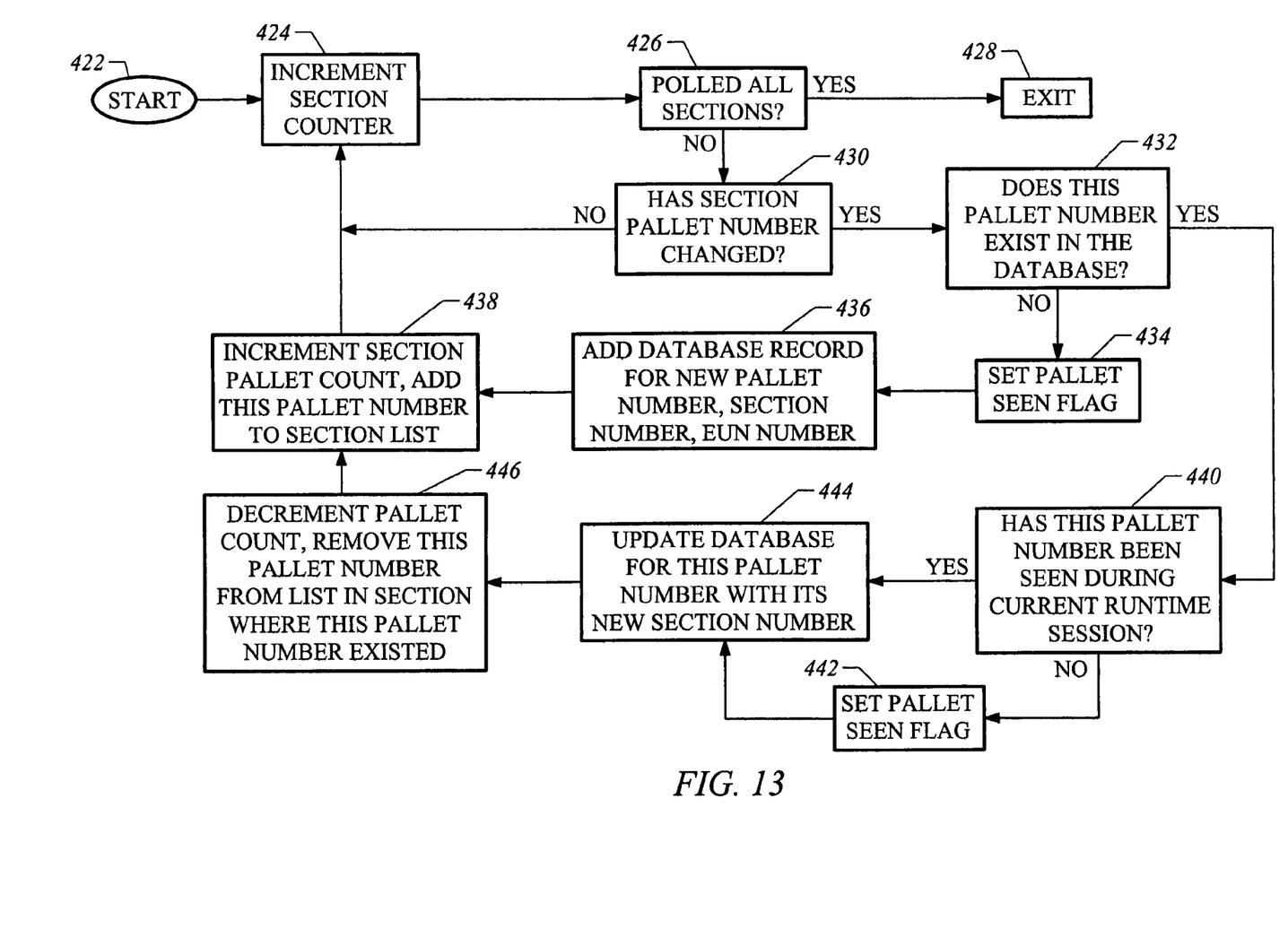
FIG. 13 shows a flowchart of a pallet tracking event timer module.

FIG. 13 shows a flow chart of the unit of production tracking event. The module starts at 422, and repeats the process for all sections by incrementing a section counter 424 until all sections have been polled 426. If they have, the process ends at exit 428. If they have not, unit of production tracking event sequence for each section begins at 430. If a new unit of production has entered the section, query at 430, processing starts at 432; otherwise, this section has not changed and processing can be skipped. At 432 the database is checked to determine if the new unit of production number is present in the database. If not, a "unit of production-seen" flag is set at 434, and a new record is created at 436. The process provides a unit of production count for the current section at 438 and then checks the next section at 424. If the test at 432 indicates that the unit of production is already in the database, then a query is made about the specific unit of production during this session 440. If it had not previously been seen, the "unit of production-seen" flag is set at 442. The unit of production location database is updated at 444. The unit of production count for the previous location of the unit of production is decremented 446, and the unit of production count for the current section is updated 438. Finally processing continues with the next section 424 until all sections have been polled 426.

The unit of production tracking algorithm is started after initialization of data collector 302 on a remote computer. Information regarding the status of units of production on the assembly line is made available to a user interface module 308 running on a separate networked computer via a shared database and a shared text file. In another embodiment, the information may be available in a shared binary file, or even merely in allocated memory associated with a process running on a computing device. In yet another embodiment, the tasks of the two remote computers may be performed by a single computer. Other implementations to achieve the same result are known to those skilled in the art; the shared text files and shared databases in the above discussion and below, are exemplary, and are not intended to limit the present disclosure.

The user interface 308 (316) displays the number of units of production in each specified section of the engine assembly line. This information is obtained from the shared database 306. In addition, the user may obtain further information from the database such as specific unit of production numbers and EUN numbers associated with each unit of production. Indicia such as color-coding, icons or markers may be used to indicate the "confidence level" of the information. The time of the most recent update to the unit of production tracking algorithm is also available to the user interface via a shared text file. In one embodiment, the plant floor personnel have some indication as to whether the system is operating or is in a static or "unit of production-hold state" on the screen.

Information of interest at the remote location includes the current number of units of production between the locations, the maximum number ever seen by the tracking algorithm in this area, and the most the manufacturing or assembly line can physically hold. The maximum seen may not exceed the area maximum and in such an event an indicator can be displayed advising users to investigate the possible addition of extra conveyor and/or a system change.

Exception reporting may include, for example, the situation when the maximum seen is greater than area maximum. Also, exception reporting may include the situation in which a unit of production is removed (i.e., a repair bay) and then returned to the system in a different location. A "self-heal" process may adjust all the numbers accordingly in both sections. If duplicate unit of production numbers are found, the system will report this. In another step the electronic unit of production number is corrected to agree with the actual physical unit of production number for accurate display in the remote computer.

Repair bays typically temporarily remove product from the main production flow in order to repair or possibly investigate build issues of the product. In some cases the product is scrapped out and completely removed from the system. In most cases the units are repaired and allowed to re-enter the system. Based on the operational plan and the quantity of units that enter a repair bay, another embodiment includes additional tracking of these areas.

Figure 14:
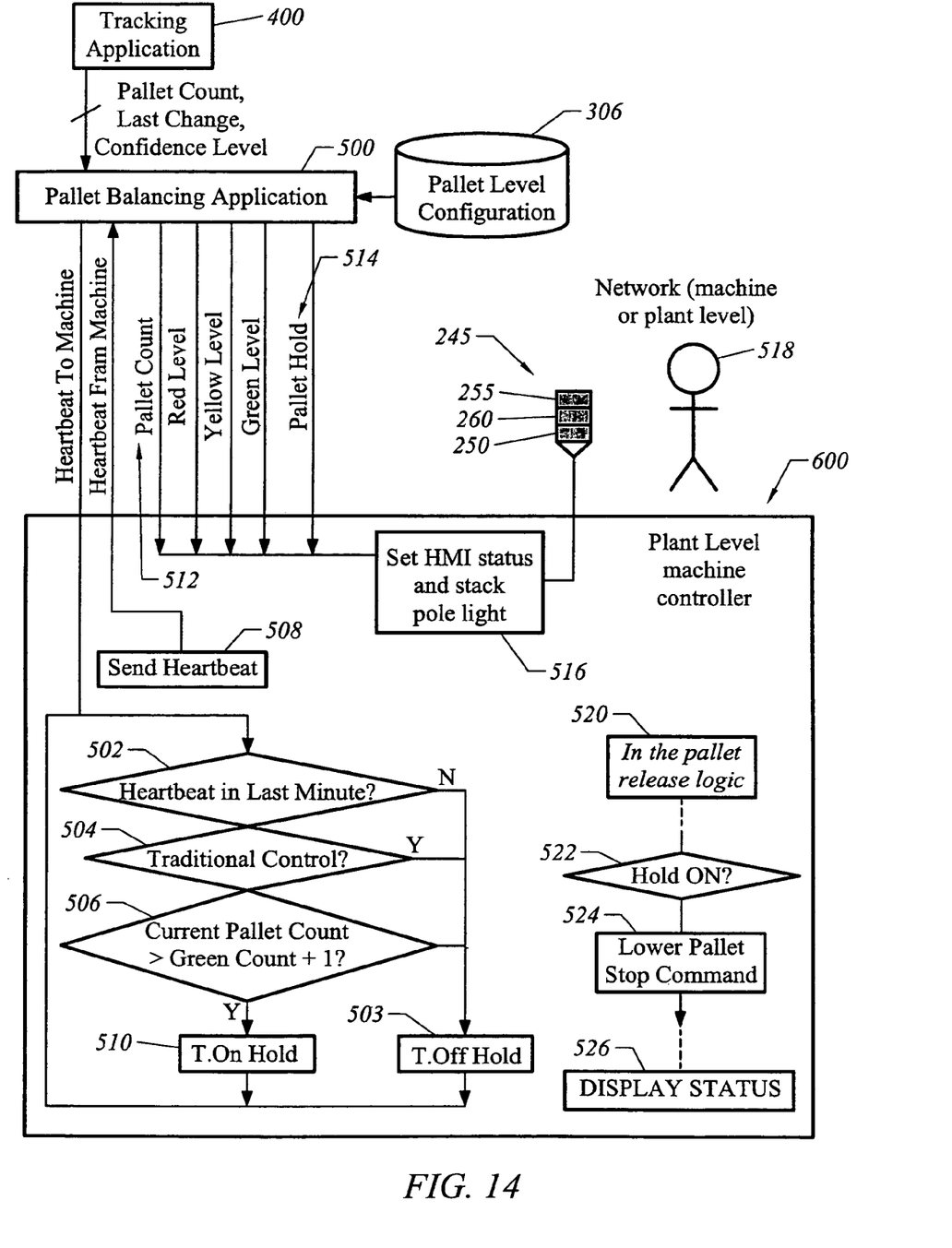
FIG. 14 is a system diagram showing a either a sensor based or controller based unit of production tracking application in communication with a plant level machine controller.

Referring to FIG. 14, the tracking application 400 as shown in previous FIGS. 10-13 is in communication with unit of production balancing application 500. In order to ensure that both the plant floor machines and the remote computer with the unit of production balancing modules are online, communicating over the network, and operating effectively, a heartbeat signal is typically used. Because unit of production tracking is not essential to production, if a heartbeat is not functioning, or if the upstream/downstream interconnected machines are not communicating on the plant floor, the machine logic may default to a free flow mode of operation, that is, the line is run with manual, visual, product or unit of production flow control. In this situation, the production system provides no computer system interlocking on product flow; as stated earlier, when the station has finished the task, the station will release the unit of production if buffer space is available. The flowcharts of FIGS. 10-13 depict unit of production tracking by remote computer and the unit of production balancing application. In the case of no remote unit of production balancing modules, similar logic may be provided on the plant level machine controllers along with the normal error trapping/diagnostics. This machine logic may also provide steps in the event that its segment is not communicating with other segments or the network connected to the remote computers.

When a balanced flow system and method as shown in FIG. 14 is implemented, any system imbalance may be investigated as to its root cause. Generally the root cause is a result of a combination of events. Events leading to machine losses, which may include downtime, overcycle, reject(s), cycle time changes, product blockages or starvation(s), empty pallets (not containing a unit of production), may be examined in investigating the root cause of a system imbalance, but other events are examined as well. The detailed root cause analysis may be performed to identify the type and location of the event and to determine if an in-line buffer contributed in any way. The historical frequency, time, quantity (of blocked starved, down, overcycle, rejects, etc.), and rate of each segment's flow may be reviewed regularly with management. When the computer regulated line balancing is implemented, in one embodiment, segments may be turned on one at a time and backwards in the direction of the flow of the system, i.e. starting at the end of the line and working towards the start of the line. Experience has shown that this minimizes surges in the line as the line balancing system is engaged. A weekly performance trending review may be established to remove the periodic or persistent machine loss issues.

In FIG. 14, element 600 describes only one aspect of the control algorithm. This may be is used to regulate units of production or flow in segments that have more than enough units of production in them. A unit of production flow balancing application 500 is in communication with database 306. A heartbeat signal 502 may be used between computational devices. If no heartbeat is present (between devices) then tracking application is off at 503, and any automated unit of production containment system may revert back to a predefined mode of operation 504. In one embodiment, the last update time is identified as current to ensure there is no "stale data" and this (system is current) is displayed as an indication on the local machine and remote computer. The system queries 506 whether the current unit of production count is new and it is greater than the target level, in this case "Green Count", plus 1. If yes, a heartbeat is sent back at step 508 informing the unit of production balancing application that the tracking system is active at 510. 506 is an example and may be replaced or augmented with additional criteria for other control conditions. Other implementations are known are known to those skilled in the art; the 506 criteria of the above discussion is exemplary and is not intended to limit the present disclosure. In another embodiment, in a red count, the hold is activated to allow the buffer to refill. Also, another embodiment includes a combination of red and green.

The unit of production balancing application 500 provides unit of production counts 512, red level 255, yellow level 260 and green level 250 or whether there is a unit of production hold 514 to the plant level controller 600. The information is, in this example, sent to stack pole light 245 at step 516. In the machine controller unit of production release logic 520, a decision 522 on the status of 503 and 510 and queries whether a unit of production may be held or released. If the unit of production is to be released at step 522, then the unit of production stop is lowered. The line operator and/or line supervisor 518 monitors the unit of production movement and status on the display at step 526 and may have the option to override any automated control of the unit of production release logic module 520.

Figure 15:
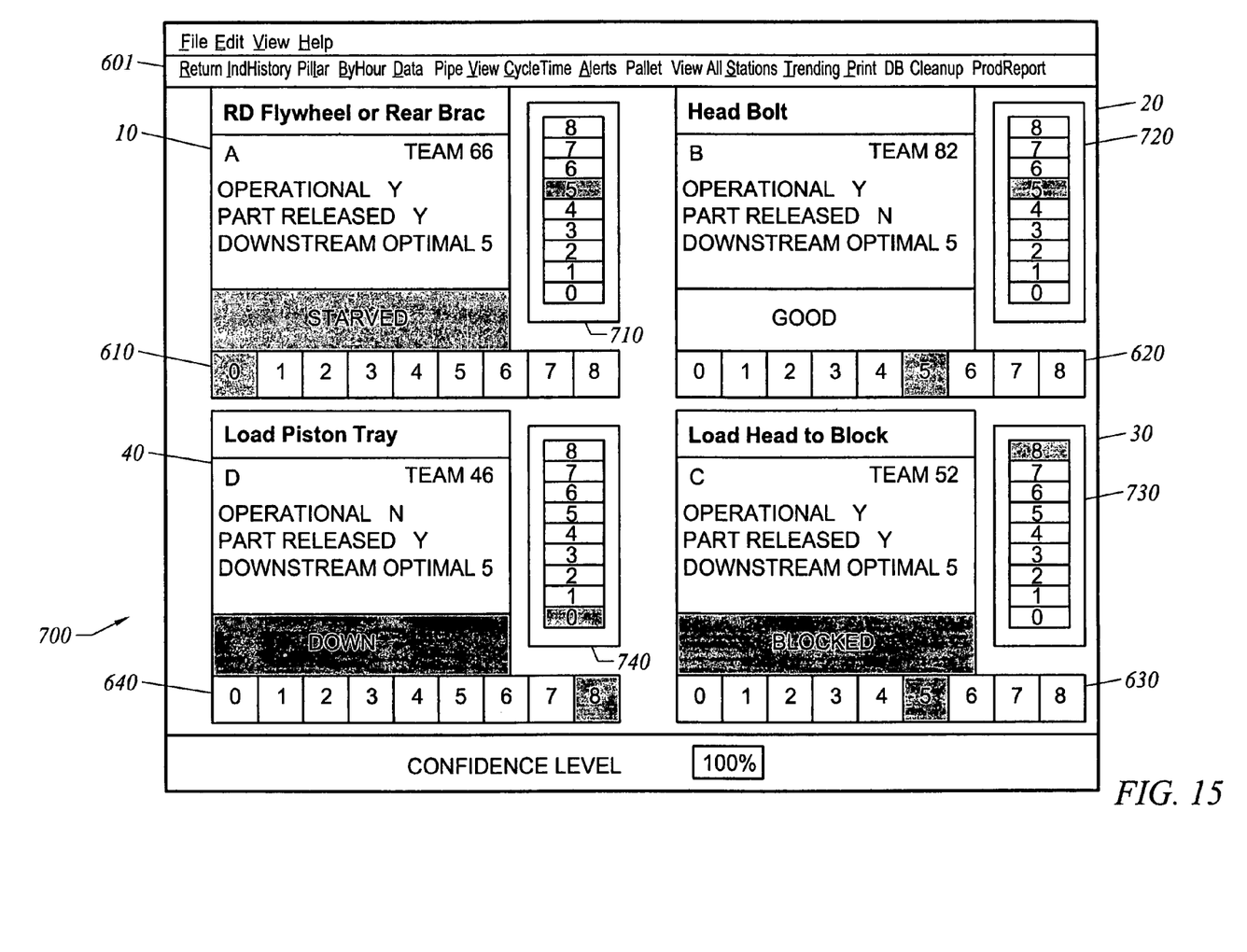
FIG. 15 is an image from a computer display screen showing the status of the machine stations of a segment.

FIG. 15 is an example machine screen image capture 700 providing indicia related to the status of the machine stations and buffers of a segment like that of FIG. 1. The unit of production count in upstream buffers for stations A, B, C, and D 20-50 are provided by indicia at 610, 620, 630, and 640, respectively. The unit of production counts in downstream buffers for the stations are provided by indicia at 710, 720, 730, and 740, respectively. The tool bar 601 may change the display to provide other information as described in this disclosure and known as relevant to those skilled in the art.

There are many possible physical layouts of manufacturing systems. Useful information in implementation of the optimization described herein includes but is not limited to the speed of the conveyance system, the quantity of units of production in the system, the cycle times (part to part) of manufacture in each station in the system, the typical operational plan, the people (teams) overlaid on the system, and the physical unit of production spacing on a system.

As described above, the embodiments of the invention may be embodied in the form of computer-implemented processes and apparatuses for practicing those processes. Embodiments of the invention may also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

The invention claimed is:

1. A method for production line optimization, comprising:
monitoring and recording for a period of time the number of units of production in a buffer upstream of a machine;
monitoring and recording for a period of time the number of units of production in a buffer downstream of a machine;
monitoring and recording for a period of time the amount of throughput by a machine;
determining an amount of throughput as a function of the number of units of production in the upstream buffer and the number of units of production in the downstream buffer; and
outputting a visual representation of the amount of throughput as a function of the units of production in the upstream buffer and the number of units of production in the downstream buffer.

2. A method as recited in claim 1 wherein the monitoring is performed by electronic sensors.

3. A method as recited in claim 1 wherein the visual representation is a histogram.

4. A method as recited in claim 1 further comprising:
from the determining step, generating values for an optimal number of units of production for the upstream buffer and an optimal number of units of production for the downstream buffer.

5. A method as recited in claim 4 further comprising:
generating a signal when there is an amount of deviation between the amount of units of production in a buffer and an optimal number of units of production of a buffer;
communicating the signal to a controller.

6. A method as recited in claim 5 further comprising:
displaying indicia relating to the signal on a display device.

7. A system for production line optimization, comprising:
a monitoring module for monitoring for a period of time a number of units of production in a buffer adjacent to a machine;
a recording module for recording for a period of time the number of units of production in the buffer adjacent to the machine;
a monitoring module for monitoring for a period of time a throughput by the machine;
a recording module for recording for a period of time the throughput by the machine;
an analyzing module that determines the throughput as a function of the number of units of production in the buffer; and
a representation module for generating a visual representation of the amount of throughput as a function of the units of production in the buffer.

8. A system as recited in claim 7 wherein the monitoring module comprises electronic sensors.

9. A system as recited in claim 7 wherein the visual representation is a histogram.

10. A system recited in claim 7 further comprising:
a determination module that outputs an optimal number of units of production for the buffer.

11. A system as recited in claim 10 wherein the number of units of production in the buffer and an optimal number of units of production for the buffer are represented by indicia.

12. A system as recited in claim 10 further comprising:
a deviation module generates a signal when there is an amount of deviation between the number of units of production in the buffer and the optimal number of units in a buffer;
a communication module for communicating the signal to a controller.

13. A system as recited in claim 12 wherein the controller is capable of affecting throughput.

14. An apparatus for optimizing production throughput in a production line segment of a particular number of units of production, comprising:
a sensor configured to detect unit of production identity and location;
an electronic communication network for sending data related to unit of production identity and location;
a computing device operatively connected to the network that according to identity instructions processes the data related to unit of production identity and location and generates a confidence level value indicating a confidence level that data processed by the computing device includes substantially all of the particular number of units of production;
at least one display device operatively connected to the computing device that provides indicia related to the confidence level value, and wherein an optimal number of units of production in the upstream buffer and an optimal number of units of production in the downstream buffer is derived from the visual representation.

15. An apparatus as recited in claim 14, further comprising:
at least one display device operatively connected to the computing device that provides indicia related to the unit of production identity and location.

16. An apparatus as recited in claim 14 wherein the segment includes at least one production line machine station, further comprising:
a first sensor configured to detect a number of units of production in an upstream buffer from a machine during a predetermined period of time;
a second sensor configured to detect a number of units of production in a downstream buffer from a machine during the predetermine period of time;
a third sensor configured to detect a throughput value of the machine during the same predetermined period of time;
a network configured to communicate to the computing device information detected by the first, second and third sensors;
generating instructions processed by the computing device calculating the number of units of production in the upstream buffer and the number of units of production in the downstream buffer and their relationship to the throughput value of the machine and accordingly generating a visual representation; and
the computing device operatively connected to at least one display device for providing indicia related to the visual representation.

17. An apparatus as recited in claim 16 wherein the optimal number of units of production in the upstream buffer and the optimal number of units of production in the downstream buffer are determined based on the amount of throughput value for a machine in a production line machine station.

18. A method for production line optimization, comprising:
monitoring and recording for a period of time the number of units of production in a buffer upstream of a machine;
monitoring and recording for a period of time the number of units of production in a buffer downstream of a machine;
monitoring and recording for a period of time the amount of throughput by a machine; and
determining an amount of throughput as a function of the number of units of production in the upstream buffer and the number of units of production in the downstream buffer, wherein the monitoring is performed by electronic sensors.

* * * * *